July 4, 1939.  R. TINKER  2,164,758
POWER TRANSMISSION
Filed May 18, 1938
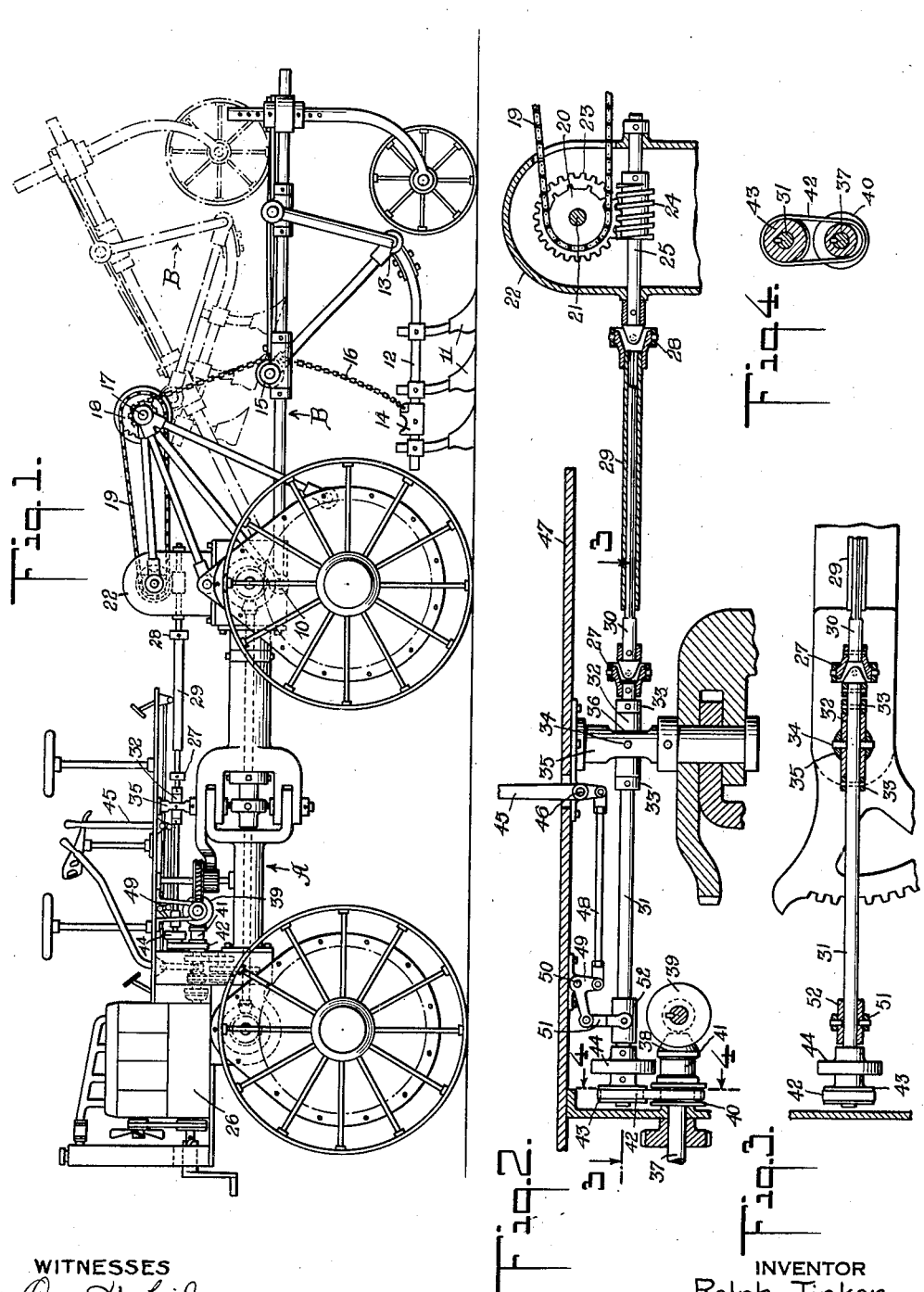
WITNESSES
INVENTOR
Ralph Tinker
BY
ATTORNEYS Patented July 4, 1939

2,164,758

UNITED STATES PATENT OFFICE 2,164,758

POWER TRANSMISSION

Ralph Tinker, Fountain City, Wis.

Application May 18, 1938, Serial No. 208,575

5 Claims. (Cl. 97—50)

This invention relates to power transmissions and has particularly to do with the manual control of power from a motor on a tractor to elevate the gang plows on a cultivator attached to the tractor.

A further object is to provide means of this character which not only through power transmission elevates gang plows but also elevates and lowers the cultivator as a whole so that it may be readily transported from place to place.

The particular construction of tractor and cultivator forms no part of the present invention except in so far as the mechanism relates to the power transmission.

With these and other objects in view, the invention consists in certain novel features of construction and combinations and arrangements of parts, all of which will be more fully hereinafter described and pointed out in the claims.

In the accompanying drawing—

Fig. 1 is a view in side elevation of a combined tractor and cultivator embodying my invention;

Fig. 2 is a fragmentary view mainly in longitudinal section but partly in elevation, illustrating my improved power transmission mechanism on the tractor;

Fig. 3 is a view in section on the line 3—3 of Fig. 2; and

Fig. 4 is a view in section on the line 4—4 of Fig. 2.

The reference character A indicates generally a tractor, and the reference character B indicates generally a cultivator which is pivotally connected to the tractor as shown at 10 and which is provided with gang plows 11, beams 12 of which are pivotally connected to the cultivator as shown at 13. These plow beams 12 are provided with saddle blocks 14 which, when the plows are elevated, are adapted to engage shives 15 on the cultivator over which chains 16 are passed, the lower ends of these chains being secured to the saddle blocks and the upper ends to a shaft 17 mounted on the tractor and on which the chains are adapted to be wound to elevate the plows and the cultivator.

The shaft 17 is provided with a sprocket wheel 18 which is connected by a sprocket chain 19 with a sprocket wheel 20 secured on a shaft 21 which extends through a gear housing 22 fixed to the end of the tractor. Power is transmitted to the shaft 21 through the medium of a worm wheel 23 fixed to the shaft and driven by a worm 24 secured to a shaft 25 which extends longitudinally of the tractor and is adapted to be driven through the medium of my improved mechanism by a motor 26 located on the tractor.

The shaft 25 is composed of sections connected by universal joints 27 and 28. Between the universal joints 27 and 28 one portion of the shaft constitutes a tube 29 on which a shaft section 30 is keyed to slide to permit of longitudinal expansion and contraction of the shaft. Another section 31 of the shaft 25 extends through a bearing sleeve 32 with collars 33 secured to the shaft at opposite ends of the sleeve. This sleeve 32 is provided intermediate its ends with trunnions 34 which have pivotal mounting on a vertical pin 35 secured to the tractor, it being understood of course that the sleeve 32 extends through an opening 36 in the pin 35 and said opening is sufficiently large to permit of a pivotal movement of the sleeve and shaft in the pin.

37 represents a shaft which is driven by the motor 26 and which is provided with a beveled friction gear 38 adapted to engage a friction spool 39 which controls the steering of the tractor, but as above stated this steering mechanism forms no part of the present invention. This shaft 37 carries a pulley 40, and also a friction wheel 41. A belt 42 extends around the pulley 40 and also around a pulley 43 on shaft section 31, and a friction wheel 44 is also located on shaft section 31 and is adapted to engage friction wheel 41 when the rear end of the shaft is moved downwardly, but is normally spaced from the friction wheel 41 as shown in Fig. 2 of the drawing.

A hand lever 45 is pivotally mounted as shown at 46 on an operator's platform 47 and is adapted to be manually moved. This hand lever 45 is connected by a link 48 with a bell crank lever 49 pivoted to the platform 47 as shown at 50. This bell crank lever is connected by a bifurcated link 51 with a sleeve 52 on shaft section 31 so that when the hand lever 45 is moved in one direction the shaft section 31 will be elevated so as to cause the belt 42 to frictionally engage pulleys 40 and 43 and drive shaft section 31 in one direction. When the shaft section 31 is lowered the belt 42 is released from frictional engagment with its pulleys, as shown in Fig. 4, and the friction wheel 44 engages friction wheel 41 to cause shaft section 31 to be driven in opposite directions. It will thus be seen that by manipulation of the hand lever 45 the operator can control the direction of movement of shaft 31 and thus control the elevation and lowering of the gang plows and the cultivator. It is also apparent that when the shaft section 31 is in an intermediate position no power will be transmitted thereto.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. In combination, a tractor and a cultivator pivotally connected thereto, a rotary shaft on the tractor, cultivator-elevating means operatively connected to the shaft and the cultivator, a worm wheel on the shaft, a driven shaft extending longitudinally of the tractor, a worm on said driven shaft meshing with the worm wheel, said driven shaft consisting of a plurality of telescoping sections, and universal joints connecting the sections, a vertical pin on the tractor, a sleeve on the driven shaft pivotally connected to the pin, permitting the shaft a pivotal movement, manually operated means for pivoting the shaft, a motor on the tractor, a drive shaft turned by the motor, and transmission means between the drive shaft and the driven shaft.

2. In combination, a tractor and a cultivator pivotally connected thereto, a rotary shaft on the tractor, cultivator-elevating means operatively connected to the shaft, a worm wheel on the shaft, a driven shaft extending longitudinally of the tractor, a worm on said driven shaft meshing with the worm wheel, said driven shaft consisting of a plurality of telescoping sections, and universal joints connecting the sections, a vertical pin on the tractor, a sleeve on the driven shaft pivotally connected to the pin, permitting the shaft a pivotal movement, manually operated means for pivoting the shaft, a motor on the tractor, a drive shaft turned by the motor, transmission means between the drive shaft and the driven shaft, said transmission means including pulleys on the respective shafts, a belt around the pulleys, and friction means on the respective drive and driven shafts.

3. In combination, a tractor and a cultivator pivotally connected thereto, a rotary shaft on the tractor, cultivator-elevating means operatively connected to the shaft extending longitudinally of the tractor, a driven shaft extending longitudinally of the motor, a worm on said driven shaft meshing with the worm wheel, said driven shaft consisting of a plurality of telescoping sections, and universal joints connecting the sections, a vertical pin on the tractor, a sleeve on the driven shaft pivotally connected to the pin, permitting the shaft a pivotal movement, manually operated means for pivoting the shaft, a motor on the tractor, a drive shaft turned by the motor, transmission means between the drive shaft and the driven shaft, said transmission means including pulleys on the respective shafts, a belt around the pulleys, and friction means on the respective drive and driven shafts, the friction means being normally spaced apart but adapted, when the shaft end is lowered, to frictionally engage when the belt is frictionally released.

4. In combination, a tractor and a cultivator pivotally connected thereto, a rotary shaft on the tractor, cultivator-elevating means operatively connected to the shaft and the cultivator, a worm wheel on the shaft, a driven shaft extending longitudinally of the tractor, a worm on said driven shaft meshing with the worm wheel, said driven shaft consisting of a plurality of telescoping sections, and universal joints connecting the sections, a vertical pin on the tractor, a sleeve on the driven shaft pivotally connected to the pin, permitting the shaft a pivotal movement, manually operated means for pivoting the shaft, a motor on the tractor, a drive shaft turned by the motor, transmission means between the drive shaft and the driven shaft, said manually-operated means including a hand lever, a bell crank lever, a link connecting the hand lever and bell crank lever, a sleeve on the driven shaft, and a link connecting said sleeve with said bell crank lever.

5. In combination, a tractor and a cultivator pivotally connected thereto, a rotary shaft on the tractor, cultivator elevating means operatively connected to the shaft extending longitudinally of the tractor, a driven shaft extending longitudinally of the motor, power transmission means between said shafts, said driven shaft consisting of a plurality of telescoping sections, and universal joints connecting the sections, a vertical pin on the tractor, a sleeve on the driven shaft pivotally connected to the pin, permitting the shaft a pivotal movement, manually operated means for pivoting the shaft, a friction pulley and a friction wheel on the rear end of the drive shaft, a friction pulley and a vertical wheel on the rear end of the driven shaft, a belt around the friction pulleys, and manually operated means to pivot the driven shaft so as to cause either the belt or the friction wheel to frictionally engage.

RALPH TINKER.